(12) United States Patent
Kubo et al.

(10) Patent No.: US 8,279,483 B2
(45) Date of Patent: Oct. 2, 2012

(54) METHOD FOR PERFORMING PATTERN MATCHING AND LINE THINNING ON AN IMAGE

(75) Inventors: Masahiko Kubo, Ebina (JP); Tomoshi Hara, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 885 days.

(21) Appl. No.: 12/205,281

(22) Filed: Sep. 5, 2008

(65) Prior Publication Data

US 2009/0225335 A1 Sep. 10, 2009

(30) Foreign Application Priority Data

Mar. 4, 2008 (JP) ................................. 2008-53324

(51) Int. Cl.
*G06K 15/02* (2006.01)
(52) U.S. Cl. ........................................................ 358/1.2
(58) Field of Classification Search ................. 358/1.2
See application file for complete search history.

(56) References Cited

U.S. PATENT DOCUMENTS

2006/0227382 A1* 10/2006 Ng et al. ...................... 358/3.26
2007/0236707 A1* 10/2007 Shoda ............................. 358/1.2

FOREIGN PATENT DOCUMENTS

| JP | 05-046758 | 2/1993 |
| JP | 05-095471 | 4/1993 |
| JP | 7-334672 | 12/1995 |
| JP | 8-63144 | 3/1996 |
| JP | 2005-341249 | 12/2005 |

* cited by examiner

*Primary Examiner* — Benny Q Tieu
*Assistant Examiner* — Eric A Rust
(74) *Attorney, Agent, or Firm* — Sughrue Mion, PLLC

(57) ABSTRACT

An image processing device that outputs a raster image to an image forming unit that forms an image at a first resolution based on the raster image, generates a raster image at a second resolution that is lower than the first resolution; inspects pixels of the generated raster image having the second resolution, and if there is a pixel group including a pixel and pixels surrounding the pixel that has a layout pattern identical to a predetermined layout pattern, replaces the pixel with a predetermined raster image having the first resolution; inspects pixels of the raster image having the first resolution, and if there is a pixel group including a pixel and pixels surrounding the pixel that satisfies a predetermined condition, replaces the pixel with a pixel of a different color; and outputs the raster image having the first resolution subjected to line-thinning to the image forming unit.

10 Claims, 10 Drawing Sheets

FIG. 7
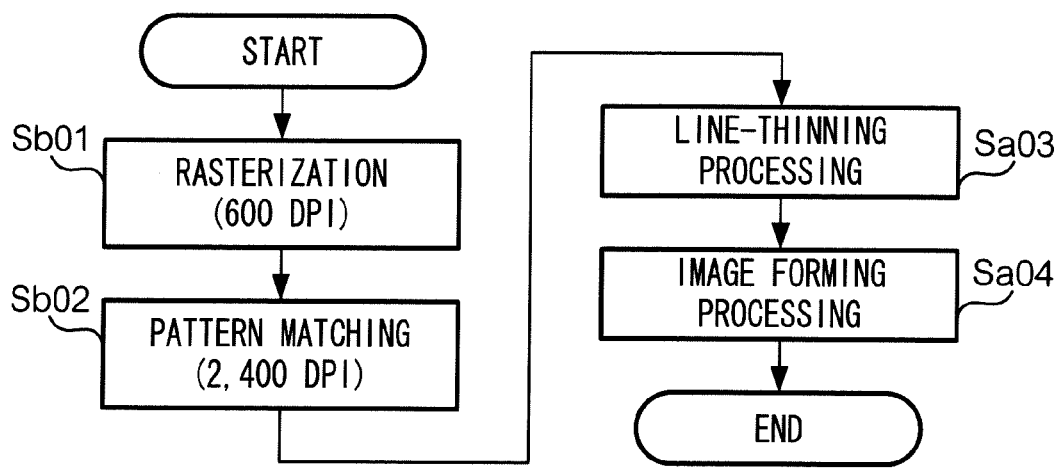
FIG. 8A
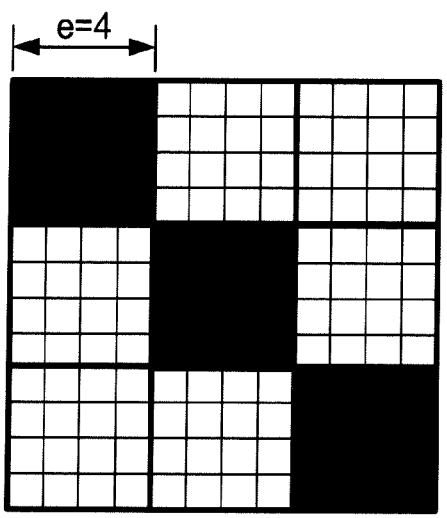
FIG. 8B
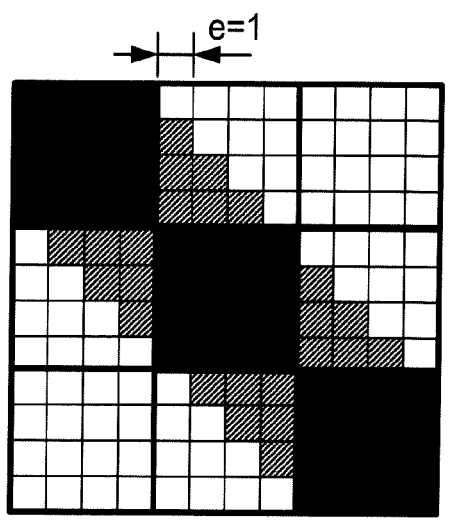
FIG. 8C
| X | 0 | 0 |
|---|---|---|
| 1 | 0 | 0 |
| X | 1 | X |
FIG. 8D
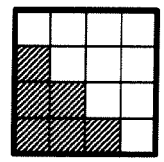

METHOD FOR PERFORMING PATTERN MATCHING AND LINE THINNING ON AN IMAGE

CROSS-REFERENCE TO RELATED APPLICATIONS

This application is based on and claims priority under 35 USC 119 from Japanese Patent Application No. 2008-53324 filed on Mar. 4, 2008.

BACKGROUND

1. Technical Field

The present invention relates to an image processing device, an image forming device, and an image processing method.

2. Related Art

An image forming device which employs an electrophotographic method sometimes causes a problem of blurring at boundary parts of electrostatic latent images due to characteristics of photosensitive materials. Consequently, lines formed on a surface of a recording material become thick. For example, small letters of a 5-point size or smaller collapse and become illegible. As methods for suppressing such blurred electrostatic latent images, downsizing of a beam aperture used in exposure, and thinning of photosensitive film thickness are commonly known. In addition to these methods, there has been developed a technique for narrowing lines and suppressing collapse of letters by controlling image data.

FIG. 11 is a flowchart showing a flow of line-thinning processing which is commonly used in a printer based on an image forming device of an electrophotographic scheme, in case that raster resolution is lower than that of an image forming device. In this flowchart and the description made below, a unit "dpi" is used as an index for indicating a resolution. This unit indicates dot/inch, i.e., a number of pixels per inch.

The image forming device firstly performs rasterization to convert image data written in a page description language (hereinafter PDL) into a raster image of 600 dpi (step Sc01). Next, the raster image is further converted into a raster image of 2,400 dpi by a resolution conversion (step Sc02). The resolution conversion simply functions to raise a resolution of a raster image. By this function, a raster image is obtained so as to match a resolution used in image formation. Where a raster image of 600 dpi is converted into a raster image of 2,400 dpi, each pixel as a minimum unit forming part of the raster image of 600 dpi is expressed by 16 pixels of 4×4 in the raster image of 2,400 dpi. The raster image of 2,400 dpi which is obtained in this manner is subjected to line-thinning by a line-thinning processing (step Sc03), and is then subjected to an image forming processing (step Sc04). Accordingly, an image of 2,400 dpi, which corresponds to the raster image subjected to line-thinning, is formed on a surface of a recording material such as a paper sheet.

The line-thinning processing will now be described. In the line-thinning processing, a raster image is inspected for each pixel. If a pixel group including plural pixels including a pixel being inspected satisfies a predetermined condition, the pixel is replaced with a background image pixel which is a pixel of a different color, thereby to achieve line-thinning for an image. There are various known methods for line-thinning processings. As examples of the known methods, a contraction algorithm and a Hilditch thinning algorithm will now be described below.

FIG. 12A shows a window used for a line-thinning processing. The window shown in this figure is an array of 3 pixels×3 pixels (3 rows×3 columns) in which a target pixel P0 in the center of the array is surrounded by peripheral pixels P1 to P8. The number of pixels constituting one edge of the window including a pixel group of the 3 pixels×3 pixels will be referred to as a "window size w". Accordingly, the window size of this window is "3". In the contraction algorithm and the Hilditch thinning algorithm, a relationship between the peripheral pixels P1 to P8 and the target pixel P0 is inspected. If the relationship satisfies a predetermined condition, the target pixel P0 is regarded as a deletion candidate, i.e., a replacement candidate to be replaced with a pixel of a different color.

FIG. 12B illustrates scanning executed on a raster image. Blocks divided by a grid shown in this figure respectively correspond to pixels constituting the raster image. The pixels included in the raster image are inspected sequentially, one after another, along an arrow Rs shown in the figure. That is, the pixels are scanned in a main scanning direction (a rightward direction from the left side to the right side of the figure, i.e., the direction of "rows"). When inspection is completed up to the right end of a row as a scanning line, the inspection then returns to the left end, and the scanning line to be inspected is shifted by one pixel in a sub scanning direction to a next row (a downward direction from upside to downside of the figure, i.e., the direction of "columns"). Inspection is further carried out on pixels on this next row, which are sequentially regarded one after another as target pixels. Pixels which are determined as deletion candidates by the inspection as described above are replaced all at once with pixels of a background color, e.g., white pixels.

FIG. 12C shows a method for determining a deletion candidate in the contraction algorithm. In the contraction algorithm, the target pixel P0 is a pixel having a black color (hereinafter "black pixel"). If at least one of the peripheral pixels P1 to P8 is a pixel having a white color (hereinafter "white pixel"), the target pixel P0 is determined as being a deletion candidate pixel. For example, as shown in the left array in FIG. 12C, if a pixel existing on the upper left of a target pixel P0 is a white pixel, i.e., if the peripheral pixel P4 is a white pixel, the target pixel P0 is regarded as a deletion candidate pixel and is replaced with a white pixel after a deletion processing, as shown in the right array in the figure.

FIG. 13 show changes of line widths in images according to a line-thinning processing which employ the contraction algorithm. In each of FIGS. 13A to 13F, each of blocks divided by a grid of solid lines corresponds to one pixel at a resolution of 2,400 dpi. Each of the blocks divided by a grid of thick lines corresponds to one pixel at a resolution of 600 dpi. If a raster image at a resolution of 600 dpi is converted into a raster image at a resolution of 2,400 dpi, 4 pixels×4 pixels are a minimum unit in the raster image obtained by the conversion. Now, a numerical value indicating the number of pixels constituting one edge of the minimum unit in the converted raster image is referred to as an "edge size". Accordingly, the edge size e is "4" for an image obtained by resolution conversion from 600 dpi to 2,400 dpi.

For example, FIG. 13A shows a state that a vertical stripe image including a stripe having a line width of one pixel at 600 dpi is converted into a raster image at 2,400 dpi by a resolution conversion. The vertical stripe image expresses a vertical stripe extending in a direction parallel to the sub scanning direction as described in FIG. 12B. In descriptions made below, a horizontal stripe image is an image in which a stripe extends in the main scanning direction described in FIG. 12B. An oblique stripe image is an image in which a stripe extends in a direction which is parallel to neither the main scanning direction nor the sub scanning directions.

In case of FIG. 13A, an image obtained by a resolution conversion is a vertical stripe image of a stripe having a line width equivalent to four pixels at 2,400 dpi, as shown in the figure. If the contraction algorithm is performed one time on the vertical stripe image, the stripe is thinned to a line width equivalent to two pixels at 2,400 dpi, as shown in FIG. 13B. Similarly, FIG. 13C shows a horizontal stripe image of a stripe having a line width equivalent to one pixel at a resolution of 600 dpi. The horizontal stripe image is subjected to a resolution conversion to 2,400 dpi, and the contraction algorithm is then performed one time on the converted image. As a result, the stripe in the horizontal stripe image is thinned to a line width of two pixels at 2,400 dpi, as shown in FIG. 13D. If the contraction algorithm is further performed one time on the vertical and horizontal stripe images shown in FIGS. 13B and 13D in which vertical and horizontal stripes having a line width equivalent to two pixels, all pixels then become white pixels and the stripes disappear.

FIG. 13E shows an oblique stripe image in which a stripe has a width equivalent to one pixel at 600 dpi. If the contraction algorithm described above is performed one time on the oblique stripe image, an image shown in FIG. 13F is obtained in which discrete dots each including 2 pixels×2 pixels are arranged obliquely in line. This is because the oblique stripe has become discontinuous after executing the contraction algorithm one time. If the contraction algorithm is further performed one time on the image shown in FIG. 13F, all pixels then become white pixels, and the stripe disappears.

Next, the Hilditch thinning algorithm will be described in brief In the Hilditch thinning algorithm, a target pixel P0 is regarded as a deletion candidate if the following six conditions are satisfied by a relationship of a target pixel P0 with peripheral pixels P1 to P8 in the window of 3 pixels×3 pixels as shown in FIG. 12A.

Condition 1: The target pixel P0 is a shape element (e.g., the target pixel has a color different from white pixels forming a background).

Condition 2: The target pixel P0 is a boundary point.

Condition 3: The target pixel P0 is not an end point.

Condition 4: The target pixel P0 is not an isolated dot.

Condition 5: Continuity is maintained between peripheral pixels even if the target pixel P0 is deleted.

Condition 6: Provided that the target pixel P0 forms part of a stripe having a line width equivalent to two pixels, only one side of the stripe disappears if the target pixel P0 is deleted.

FIG. 14 show images subjected to line-thinning by the Hilditch thinning algorithm. Where the Hilditch thinning algorithm is performed one time on the vertical stripe image shown in FIG. 13A, the vertical stripe image as shown in FIG. 13B is obtained as a result of line-thinning. If the vertical stripe image shown in FIG. 13B is further subjected to line-thinning by the Hilditch thinning algorithm, a vertical stripe image as shown in FIG. 14A is obtained. That is, so far as a vertical stripe image is concerned, a stripe in the vertical stripe image neither becomes discontinuous nor disappears even after the Hilditch thinning algorithm is performed twice. Similarly, a horizontal stripe image as shown in FIG. 13D is obtained by performing line-thinning according to the Hilditch thinning algorithm on the horizontal stripe image shown in FIG. 13C. If line-thinning is further performed on the horizontal stripe image as shown in FIG. 13D, a horizontal stripe image as shown in FIG. 14B is obtained, and thus, a horizontal stripe in a horizontal stripe image neither becomes discontinuous nor disappears.

Meanwhile, if the Hilditch thinning algorithm is performed one time on the oblique stripe image shown in FIG. 13E, an oblique stripe in a resultant image becomes discontinuous, e.g., divided into discrete stripe segments as shown in FIG. 14C. If line-thinning is further performed on the resultant image, an image shown in FIG. 14D is obtained, and thus, intervals enlarge between discrete oblique stripe segments. Thus, if a raster image at a resolution of 600 dpi is converted into a raster image of a resolution of 2,400 dpi, which is then subjected to line-thinning based on the Hilditch thinning algorithm, line-thinning is achieved successfully without making stripes discontinuous so far as vertical and horizontal stripe images are concerned. However, in case of an oblique stripe image, an oblique stripe in the image becomes discontinuous by performing a line-thinning processing only one time.

As has been described above, if line-thinning with use of a window size w=3 is carried out after converting a raster image rasterized at 600 dpi into a raster image at 2,400 dpi, there is a case that content of the image disappears by employing the contraction algorithm. Also, in case of employing the Hilditch thinning algorithm, there is a case that an oblique stripe in an image becomes discontinuous.

SUMMARY

An aspect of the present invention provides an image processing device that outputs a raster image to an image forming unit that forms an image at a first resolution on the basis of the raster image, including: a raster image generation unit that generates a raster image at a second resolution that is lower than the first resolution; a pattern storage unit that stores a layout pattern of pixels of a raster image having the second resolution in accordance with a raster image having the first resolution; a pattern matching unit that inspects pixels of the raster image having the second resolution generated by the raster image generation unit, and if there is a pixel group including a pixel and pixels surrounding the pixel that has a layout pattern identical to the layout pattern stored in the pattern storage unit, replacing the pixel with the raster image having the first resolution stored in the pattern storage unit; a line-thinning unit that performs line-thinning on the raster image having the first resolution generated by the pattern matching unit by inspecting pixels of the raster image having the first resolution, and if there is a pixel group including a pixel and pixels surrounding the pixel that satisfies a predetermined condition, replacing the pixel with a pixel of a different color, a number of pixels constituting an edge of the pixel group being equal to or greater than a number of pixels constituting an edge of a minimum unit of the raster image having the second resolution generated by the raster image generation unit; and an output unit that outputs the raster image having the first resolution subjected to line-thinning of the line-thinning unit to the image forming unit.

BRIEF DESCRIPTION OF THE DRAWINGS

Exemplary embodiments of the present invention will now be described in detail below with reference to the following figures, wherein:

FIG. 7 is a flowchart showing a flow of processings executed by the image forming device according to the second exemplary embodiment;

FIGS. 8A, 8B, 8C, and 8D illustrate an example of a raster image at 600 dpi, and a pattern matching performed on the raster image;

DETAILED DESCRIPTION

Exemplary embodiments of the invention will now be described with reference to the drawings.

A. First Exemplary Embodiment

A-1. Structure

Figure 1:
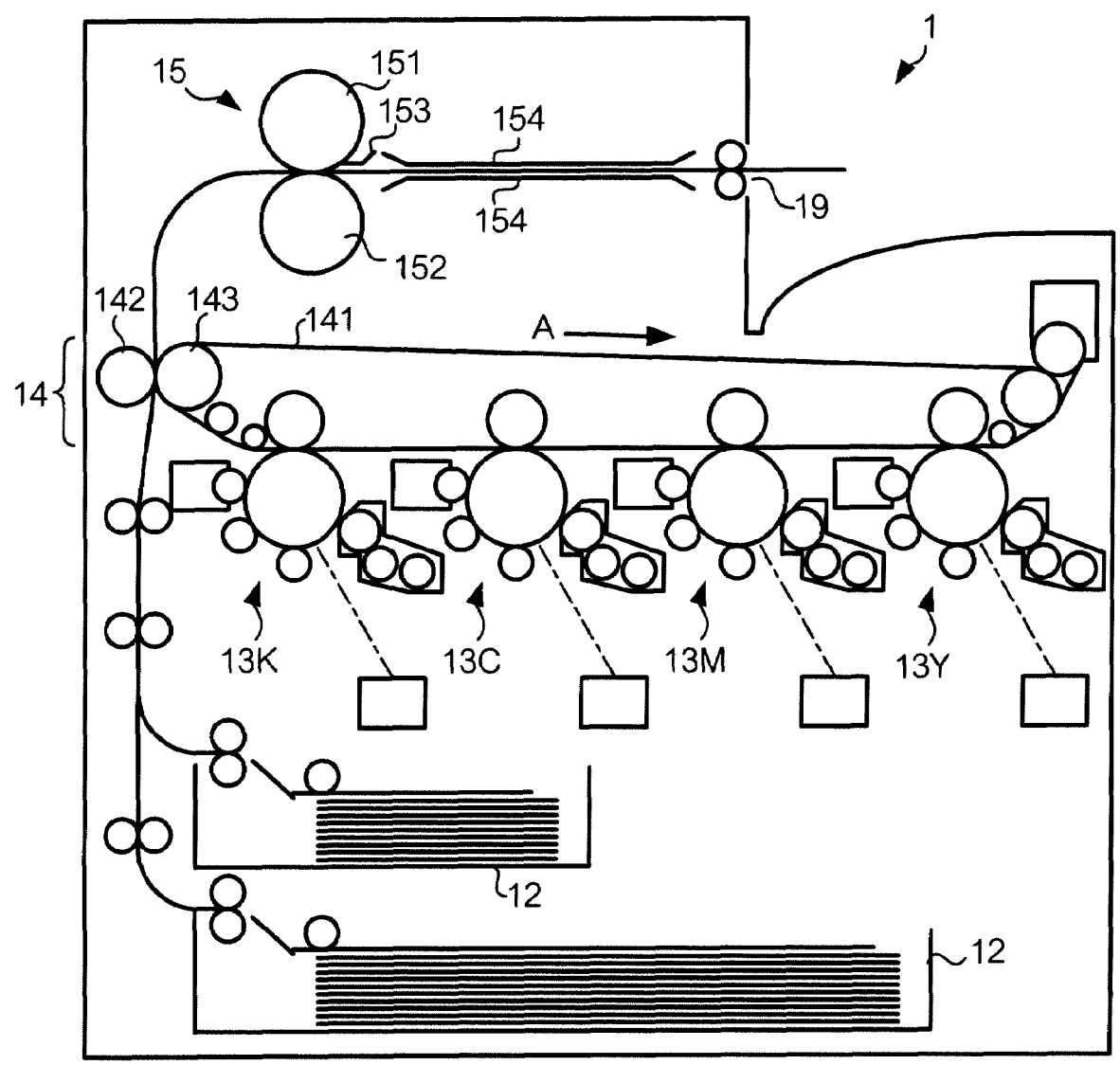
FIG. 1 shows a mechanical structure of an image forming device according to the first exemplary embodiment of the invention.

FIG. 1 shows a structure of an image forming device 1 according to the first exemplary embodiment of the invention.

As shown in FIG. 1, the image forming device 1 has sheet container units 12, image forming units 13Y, 13M, 13c, and 13K, a transfer unit 14, and a fixing unit 15. These units are controlled by a control unit 1020 which will be described later, and as a whole functions as an image forming unit. Images formed by the image forming unit have, for example, a resolution of 2,400 dpi. Suffixial codes Y, M, C, and K indicate that components denoted at reference symbols added with these suffixial codes refer to components related to yellow, magenta, cyan, and black toners, respectively. Each of the sheet container units 12 contain paper sheets cut into a predetermined size such as A3 or A4 paper sheets contained in sheet container units 12 are picked up one after another by a pickup roller or the like and is conveyed to the transfer unit 14 through a sheet convey path.

Each of the image forming units 13Y, 13M, 13C, and 13K include a photosensitive drum, a charging unit, an exposing unit, a developing unit, a primary transfer roll, and a cleaning member. The image forming units 13Y, 13M, 13C, and 13K form toner images according to image data by using toners (coloring materials) of corresponding colors, respectively, and transfers the toner images to an intermediate transfer belt 141, layering the toner images on each other. The transfer unit 14 includes the intermediate transfer belt 141, a secondary transfer roll 142, and an opposite roll 143 which faces the secondary transfer roll 142 with the intermediate transfer belt 141 inserted in between. The transfer unit 14 is a transfer unit to transfer the toner images formed by the image forming units 13Y, 13M, 13C, and 13K to a paper sheet. The intermediate transfer belt 141 is driven to turn around in a direction A in the figure. When toner images are transferred layered on each other to the intermediate transfer belt 141, the intermediate transfer belt 141 then carries the toner images to a position between the secondary transfer roll 142 and the opposite roll 143. Owing to an electric potential difference to the intermediate transfer belt 141, the secondary transfer roll 142 transfers the toner images on the intermediate transfer belt 141 to a paper sheet conveyed from a sheet container unit 12. The paper sheet to which the toner images have been fixed is conveyed to the fixing unit 15.

The fixing unit 15 has a heat roll 151 and a pressure roll 152, and clamps the paper sheet conveyed from the secondary transfer roll 142 between the heat roll 151 and the pressure roll 152. The fixing unit 15 applies heat and pressure to the paper sheet, to fix the toner images to the paper sheet. The heat roll 151 internally has a heat source such as a halogen lamp, and heats the surface of the paper sheet to about 90 degrees. The pressure roll 152 is pressed against the heat roll 151, and applies a pressure to the paper sheet which is passing through the heat roll 151 and the pressure roll 152. Near the surface of the heat roll 151, there is provided a separation member 153 formed of metal or resins. After completion of a fixing process in which as a heat and a pressure are applied, the paper sheet is separated from the heat roll 151, and is guided to a sheet output port 19 by two guides 154 forming part of the sheet convey path.

The image forming device 1 has a structure as described above.

Figure 2:
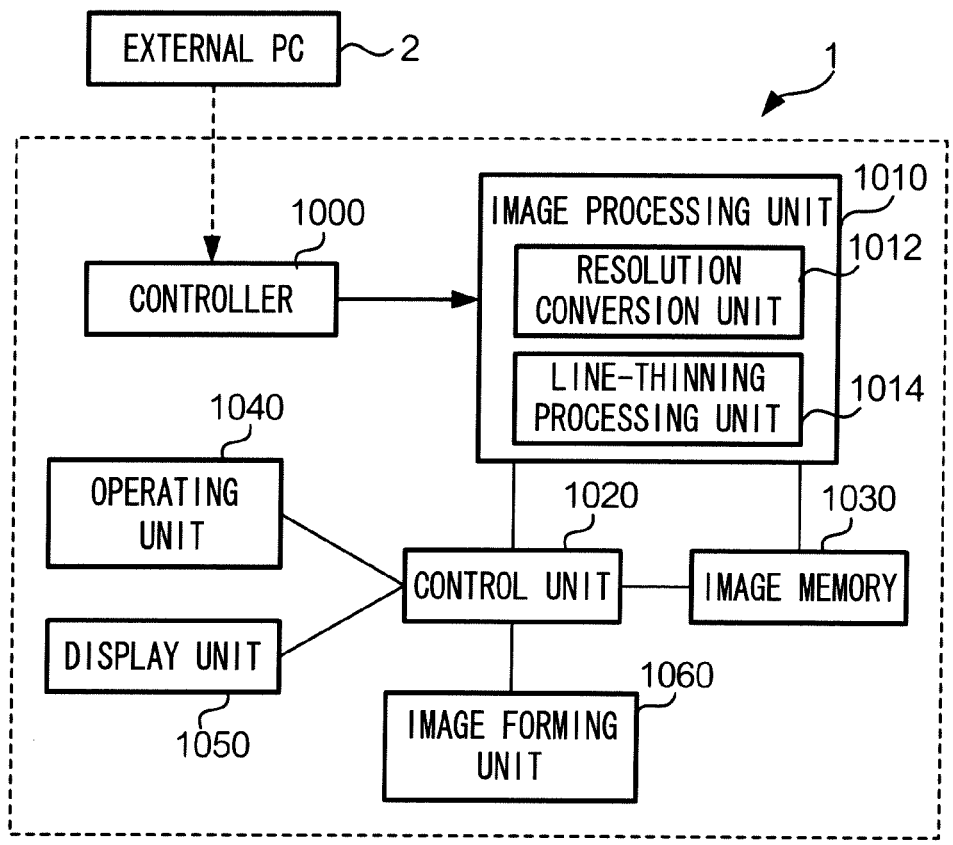
FIG. 2 is a block diagram showing an electric structure of the image forming device according to the first exemplary embodiment.

FIG. 2 is a block diagram showing an electric structure of the image forming device 1.

The image forming device 1 includes a controller 1000, an image processing unit 1010, a control unit 1020, an image memory 1030, an operating unit 1040, a display unit 1050, and an image forming unit 1060. The image forming device 1 is connected to be communicable with an external PC2 such as a personal computer wirelessly or by a cable, and receives image data (hereinafter "PDL" data) described in a PDL from the external PC2. The controller 1000 performs a rasterization based on PDL data received from the external PC2, to generate a raster image at 1,200 dpi, and outputs the raster image to the image processing unit 1010. That is, the controller 1000 is a raster image generation unit. A resolution conversion unit 1012 in the image processing unit 1010 performs a resolution conversion to convert the raster image at 1,200 dpi into a raster image at 2,400 dpi, and outputs the converted raster image to the image memory 1030.

The image memory 1030 stores the raster image at 2,400 dpi which the resolution conversion unit 1012 has output. A line-thinning processing unit 1014 in the image processing unit 1010 performs a line-thinning processing based on the Hilditch thinning algorithm by using the window having a window size w=3 described previously. In this case, the resolution (hereinafter "first resolution") of the raster image which is output from the controller 1000 is half the resolution (hereinafter "second resolution") of the raster image at which the line-thinning processing unit 1014 carries out a line-thinning processing. The first resolution may be higher than half of the second resolution insofar as the first resolution is lower than the second resolution.

The control unit 1020 is constituted of a CPU (Central Processing Unit) and controls respective components forming the image forming device 1. The display unit 1050 is, for example, a liquid crystal display device. Based on data supplied from the control unit 1020, the display unit 1050 displays a conversation screen and a variety of information for users. The operating unit 1040 includes buttons and switches, and accepts commands which are input by users. The operating unit 1040 supplies signals corresponding to content of the commands to the control unit 1020. The image forming unit 1060 includes the sheet container units 12 described previously, image forming units 13Y, 13M, 13c, and 13K, transfer unit 14, and fixing unit 15. Based on a raster image which is read from the image memory 1030 by the control unit 1020, the image forming unit 1060 carries out an image forming processing, and thereby forms an image on a recording material (such as a paper sheet).

A-2. Operation

Next, operation of the first exemplary embodiment and effects achieved by the image forming device 1 will be described.

Figure 3:
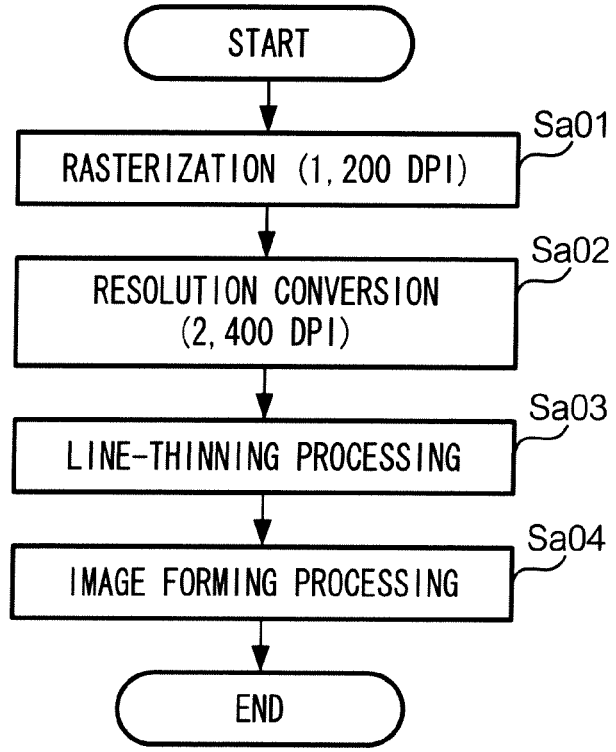
FIG. 3 is a flowchart showing a flow of processings executed by the image forming device according to the first exemplary embodiment.

FIG. 3 is a flowchart showing a flow of processings executed by the image forming device 1. At first, the controller 1000 of the image forming device 1 receives PDL data from the external PC2, and then rasterizes the PDL data to generate a raster image at a resolution which is not lower than half of the resolution of 2,400 dpi of the image forming unit but is lower than the resolution of 2,400 dpi, e.g., a raster image at resolution of 1,200 dpi which is a half of the resolution of 2,400 dpi (step Sa01). The raster image at the resolution of 1,200 dpi obtained in this manner is supplied to the image processing unit 1010 of the image forming device 1, and is converted into a raster image at the resolution of 2,400 dpi as a resolution of the image forming device 1, by the resolution conversion unit 1012 (step Sa02). Further, the raster image is subjected to a line-thinning processing by the line-thinning processing unit 1014 of the image processing unit 1010 (step Sa03), and is then stored into the image memory 1030. Thereafter, the raster image subjected to the line-thinning processing is supplied to the image forming unit 1060 under control of the control unit 1020, and an image forming processing is carried out (step Sa04).

A difference will now be described between a raster image rasterized at 1,200 dpi, which is obtained by the controller 1000, and a raster image rasterized at a lower resolution of 600 dpi than 1,200 dpi.

Figure 4A:
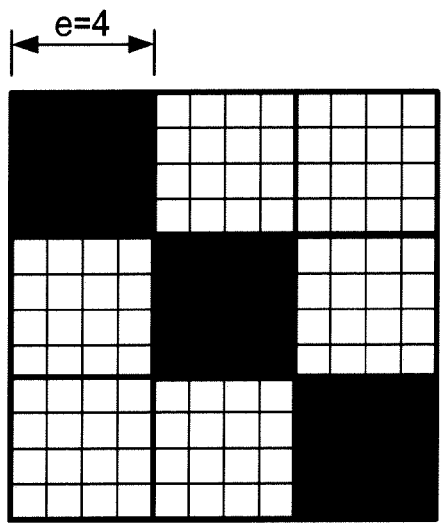
FIGS. 4A, 4B, 4C, 4D, and 4E each show a raster image obtained by rasterizing an oblique stripe image including a stripe having a width of one pixel at 600 dpi.

FIG. 4A shows a raster image in a case where an oblique stripe having a width of one pixel at 600 dpi is rasterized first at 600 dpi and then subjected to a resolution conversion at 2,400 dpi. In this figure, blocks drawn by fat lines respectively correspond to pixels at 600 dpi, and blocks drawn by solid lines respectively correspond to pixels at 2,400 dpi. Since the resolution conversion is performed from 600 dpi to 2,400 dpi which is four times higher than 600 dpi, the raster image has an edge size e of "4", as shown in FIG. 4A.

Figure 4B:
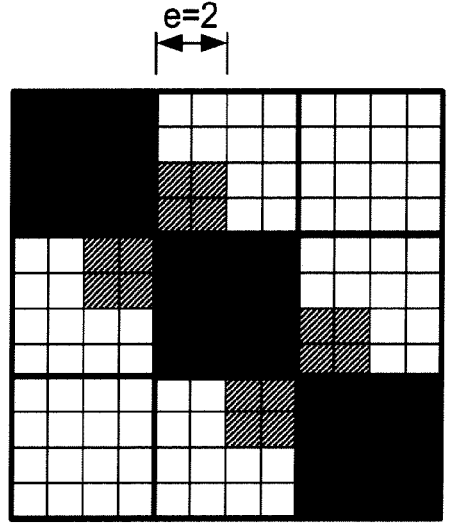

Meanwhile, FIG. 4B shows a raster image in a case where an oblique stripe having a width of one pixel at 600 dpi is first rasterized at 1,200 dpi and is then subjected to a resolution conversion at 2,400 dpi. Obliquely hatched parts in FIG. 4B denote parts that differ from the raster image shown in FIG. 4A, and indicate black pixels. In this case, a resolution conversion is performed from 1,200 dpi to 2,400 dpi which is twice higher than 1,200 dpi. The edge size e of this raster image is "2" as shown in FIG. 4B. In this manner, a rasterization is once carried out at a resolution (600 dpi) which is lower than half of a resolution (2,400 dpi) used for the line-thinning processing, and a resolution conversion is thereafter carried out into a resolution (2,400 dpi) used for the line-thinning processing. An edge size e=4 is then obtained as a result. In contrast in a different manner, a rasterization is once carried out at a resolution which is half the resolution of a raster image to be subjected to a line-thinning processing, and thereafter, and a resolution conversion is thereafter carried out at a resolution (2,400 dpi) used for the line-thinning processing. Then, an edge size e=2 is obtained as a result. In the first exemplary embodiment, the image forming device 1 executes a line-thinning processing with use of a window having a window size w=3. Hence, a relationship of window size w>edge size e needs to be satisfied.

Descriptions will now be made below about reasons why the relationship of window size w>edge size e needs to be satisfied and why the resolution of rasterization is set so as to not be smaller than half the resolution of a raster image to be subjected to the line-thinning processing.

The need to satisfy the relationship of window size w>edge size e arises from reasons as follow.

Figure 4C:
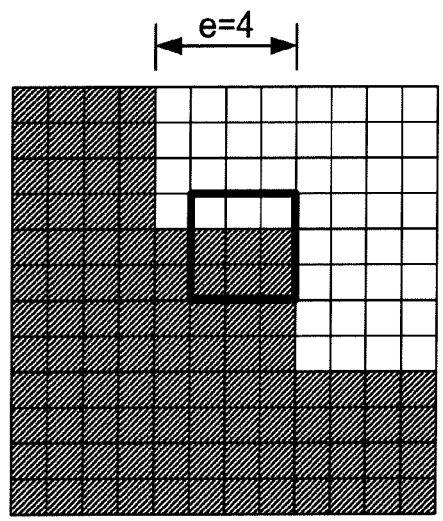

FIG. 4C shows an oblique stripe image having an edge size e=4. Each one of the pixel in this oblique stripe image is of a resolution of 600 dpi, and therefore corresponds to 4 pixels×4 pixels=16 pixels after a resolution conversion into 2,400 dpi is carried out. With use of a window having a window size w=3, a line-thinning processing is performed on the raster image at the resolution of 2,400 dpi, e.g., an oblique stripe image including an oblique stripe extending at 45 degrees to both the main and sub scanning directions. When the window is positioned as emphasized with a frame drawn by a fat line in FIG. 4C, three pixels existing in the upper side of a target pixel are all white pixels, and therefore, whether or not the target pixel forms part of the oblique stripe is unclear. That is, depending on the position of the target pixel being inspected, there is a case where it cannot be distinguished whether black pixels in the window or any other kind of stripe such as a vertical or horizontal stripe form part of an oblique stripe. Further, the line-thinning processing unit 1014 cannot specify a direction in which the target pixel at the center of the window should be thinned.

Figure 4D:
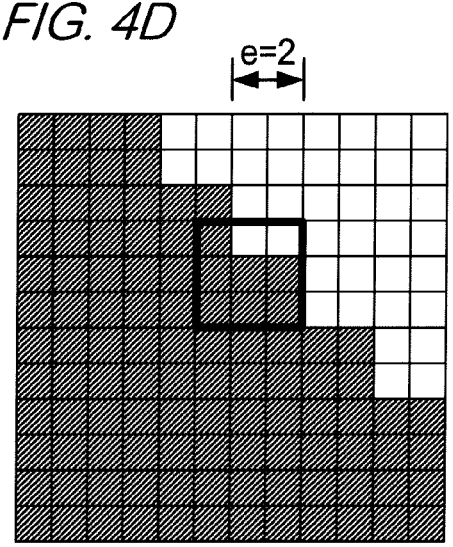

On the other hand, FIG. 4D shows an oblique stripe image having an edge size e=2. Each pixel in this oblique stripe image is of a resolution of 1,200 dpi, and therefore corresponds to 2 pixels×2 pixels=4 pixels after a resolution conversion into 2,400 dpi is carried out. With use of a window having a window size w=3, a line-thinning processing is performed on the raster image at the resolution of 2,400 dpi, e.g., an oblique stripe image including an oblique stripe extending at 45 degrees to both the main and sub scanning directions. When the window is positioned as emphasized with a frame drawn by a fat line in FIG. 4D at the same position as the window in FIG. 4C, a pixel existing at the upper left side relative to a target pixel is a black pixel, and hence obviously, black pixels in the window form part of an oblique stripe. In FIG. 4C, the target pixel in the window cannot be distinguished from pixels forming part of a horizontal stripe, and consequently, a line-thinning is performed incorrectly in the same direction as in the case of a horizontal stripe. However, in FIG. 4D, such an incorrect line-thinning does not occur but a line-thinning is performed in a proper direction. Thus, if the relationship of window size w>edge size e is satisfied, a direction of performing a line-thinning on black pixels inspected by the window can be properly specified.

Described next will be reasons why the resolution of rasterization is set so as to not be smaller than the raster image to be subjected to the line-thinning processing.

Figure 4E:
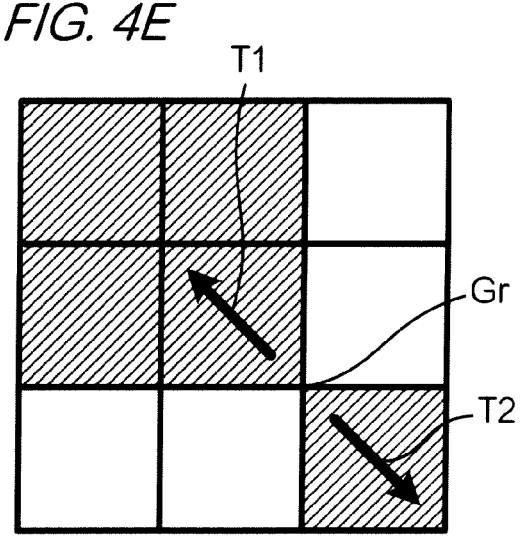

FIG. 4E shows black pixels which are in contact with each other only at a vertex Gr. The term of "vertex" indicates a cross point between grid lines where a raster image is fit into a grid. If there are black pixels which are in contact with each other only at a vertex, the line-thinning processing acts so that four black pixels in an upper left area in the figure are subjected to a line-thinning in a direction of arrow T1 while one black pixel in a lower right area in the figure is subjected to a line-thinning in a direction of arrow T2, as shown in the figure. Accordingly, the black pixels which are in contact with each other at the vertex Gr tend to be easily replaced with white pixels. Therefore, it may be highly possible that an oblique stripe is disconnected at the position of the vertex Gr.

When expressing an oblique stripe extending at 45 degrees to both the main and sub scanning directions at a certain resolution, an expressible limit of a line width is a width equivalent to one pixel at the resolution at most. For example, where a rasterization is performed at a resolution of 600 dpi, an oblique stripe which has a width of one pixel at 600 dpi is expressed by black pixels which are in contact with each other only at vertices of pixels, as shown in FIG. 4E. In contrast, if an oblique stripe having the same width as above (e.g., a width of one pixel at 600 dpi) is subjected to a rasterization at 1,200 dpi, black pixels come to make contact with each other not only at vertices of pixels but also on edges of pixels. Accordingly, even if such black pixels are subjected to a line-thinning, there is a low possibility that the oblique stripe may become discrete.

Thus, if a resolution of a rasterization is set so as to not be smaller than half the resolution of a raster image to be subjected to a line-thinning, there is a possibility that an oblique stripe becomes discrete as a result of performing a line-thinning processing on an oblique stripe image including an oblique stripe having the same width.

FIG. 5 show results of line-thinnings executed by the image forming device 1 according to the first exemplary embodiment.

Figure 5A:
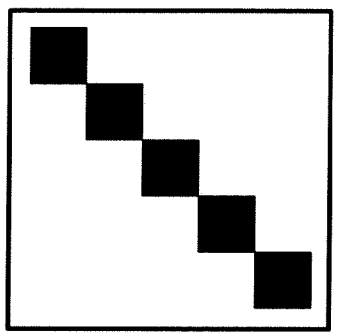
FIGS. 5A, 5B, 5C, and 5D each show a result of line-thinning executed by the image forming device 1 according to the first exemplary embodiment.
Figure 5B:
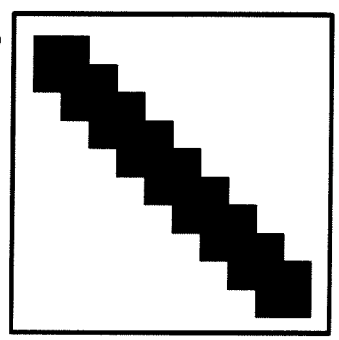
Figure 5C:
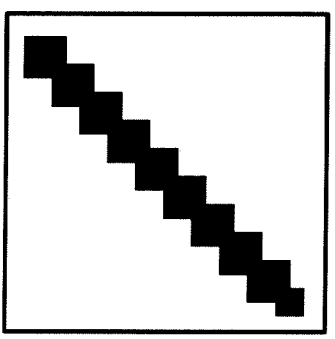
Figure 5D:
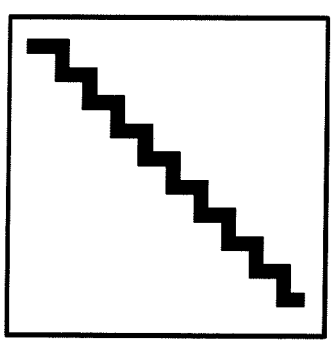

FIG. 5A shows a raster image of an oblique stripe image rasterized first at 600 dpi. FIG. 5B shows a raster image of an oblique stripe image rasterized first at 1,200 dpi by the image forming device 1 according to the first exemplary embodiment. FIG. 5C shows a raster image in case where a line-thinning processing based on the Hilditch thinning algorithm is performed once on the raster image shown in FIG. 5B. FIG. 5D shows a raster image in a case where the line-thinning processing is further performed on FIG. 5C. Thus, according to the image forming device 1, an oblique stripe does not become discrete even if a line-thinning based on the Hilditch algorithm is carried out, as can be understood from descriptions made above. This is a results of the relationship of window size w>edge size e in the line-thinning processing. Further, the image forming device 1 according to the first exemplary embodiment is capable of specifying a direction of performing a line-thinning on black pixels inspected by using the window, so that a proper line-thinning can be performed on the black pixels. In addition, existence of obliquely hatched parts in FIG. 4B successfully contributes to elimination of black pixels which are in contact with each other only at vertices of pixels. Therefore, if a line-thinning is performed on an oblique stripe image, there is a lower possibility that an oblique stripe in the image becomes discrete.

Further, the image forming device 1 according to the first exemplary embodiment carries out a rasterization at the first resolution (1,200 dpi) which is lower than the second resolution (2,400 dpi) as a resolution of the image forming unit. Therefore, the volume of data to be dealt with by the controller 1000 can be further reduced, compared with a different image forming device which carries out a rasterization at the second resolution. Accordingly, a load of the rasterization processing of the controller 1000 is reduced, and the volume of data which can be rasterized per unit time increases. As a result, a greater volume of PDL data can be rasterized rapidly, than in a case of an image forming device which performs a rasterization at the second resolution as described above.

B. Second Exemplary Embodiment

Next, an image forming device 1 according to the second exemplary embodiment of the invention will be described. Hereinafter, features of the structure which are common to the first exemplary embodiment will be denoted with common reference symbols, and descriptions of those features will be omitted herefrom.

B-1. Structure

Figure 6:
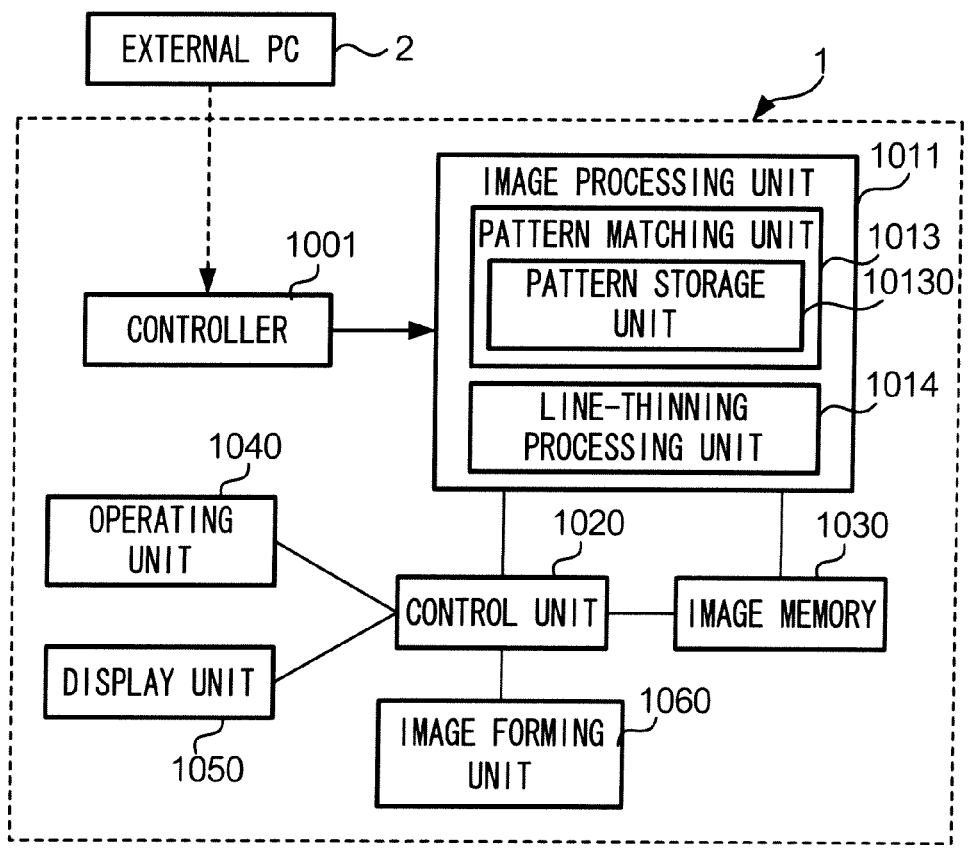
FIG. 6 is a block diagram showing an electric structure of an image forming device according to the second exemplary embodiment.
Figure 9A:
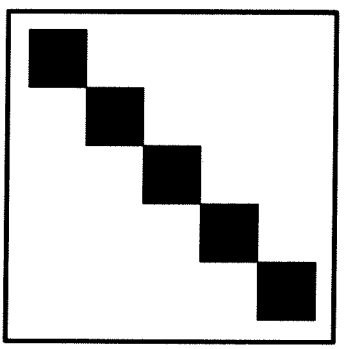
FIGS. 9A, 9B, 9C, and 9D each show a result of line-thinning executed by the image forming device according to the second exemplary embodiment.
Figure 9B:
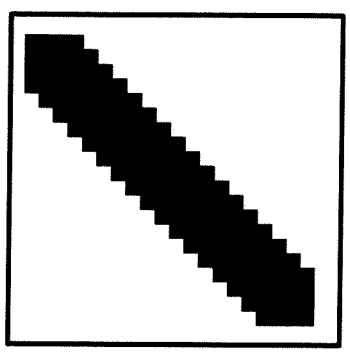
Figure 9C:
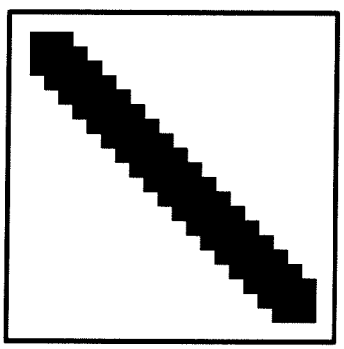
Figure 9D:
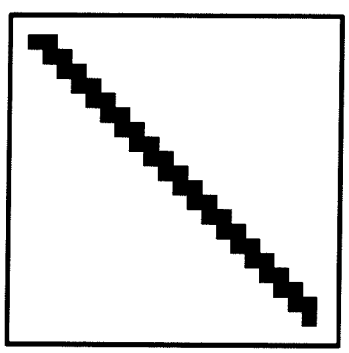

FIG. 6 is a block diagram showing an electric structure of the image forming device 1 according to the second exemplary embodiment.

The image forming device 1 according to the second exemplary embodiment has a controller 1001 and an image processing unit 1011 respectively in place of the controller 1000 and the image processing unit 1010 in the first exemplary embodiment. The controller 1001 is basically the same raster image generation unit as the controller 1000 according to the first exemplary embodiment but differs from the controller 1000 in that 600 dpi is the resolution of a raster image which is generated on the basis of PDL data received from the external unit PC2. The image processing unit 1011 has a pattern matching unit 1013 in place of the resolution conversion unit 1012 in the first exemplary embodiment. The pattern matching unit 1013 has a pattern storage unit 10130. The pattern storage unit 10130 is a relationship storage unit which stores correspondence between predetermined plural pixel layout patterns and raster images at 2,400 dpi as a resolution of the image forming unit. A minimum unit for raster images stored in the pattern storage unit 10130 is one pixel at 2,400 dpi. Further, the pattern matching unit 1013 inspects each pixel of a raster image having the resolution of 600 dpi as described above, and extracts a pattern which corresponds to a combination of each pixel with peripheral pixels from among the patterns stored in the pattern storage unit 10130. The pattern matching unit 1013 replaces each pixel with a raster image associated with the extracted pattern, and then outputs the pixel to the image memory 1030. That is, for each pixel of a raster image at the first resolution which is generated by the controller 1001 as a raster image generation unit, the pattern matching unit 1013 compares a layout pattern including the pixel being inspected and peripheral pixels, with layout patterns stored in the relationship storage unit, and replaces the raster image at the first resolution with a raster image associated with a layout pattern corresponding to the raster image at the first resolution.

B-2. Operation

Next, operation of the image forming device 1 according to the second exemplary embodiment will be described.

FIG. 7 is a flowchart showing a flow of processings executed by the image forming device 1 according to the second exemplary embodiment. The image forming device 1 according to the second exemplary embodiment performs a rasterization at 600 dpi (step Sb01) in place of the rasterization in the first exemplary embodiment (step Sa01), as described above. Further, the image forming device 1 according to the second exemplary embodiment performs a pattern matching (step Sb02) in place of the resolution conversion in the first exemplary embodiment (step Sa02).

The pattern matching will now be described below. The pattern matching unit 1013 receives a raster image at 600 dpi which is output by the controller 1001. Further, for each pixel of the raster image, the pattern matching unit 1013 inspects the raster image, and extracts a pattern corresponding to a combination of each pixel being inspected with peripheral pixels thereof, from among patterns stored in the pattern storage unit 10130. The pattern matching unit 1013 replaces each pixel being inspected with a raster image associated with the extracted pattern, and outputs a result to the image memory 1030.

FIG. 8A shows an example of a raster image at 600 dpi. As shown in this figure, an oblique stripe image expressing a stripe having a width of one pixel at 600 dpi is converted into a raster image in which black pixels are in contact with each other at vertices of the black pixels. On the other hand, FIG. 8C shows an example of a pattern stored in the pattern storage unit 10130 in the pattern matching unit 1013. FIG. 8D is a raster image at 2,400 dpi which is stored in the pattern storage unit 10130 and is associated with the pattern shown in FIG. 8C. Blocks divided by a grid in FIG. 8C respectively correspond to pixels at 600 dpi, and the block positioned in the center is a target pixel. Numerals "0" and "1" respectively indicate a white pixel and a black pixel. A symbol "X" indicates a pixel which can be either a white or a black pixel. The pattern matching unit 1013 inspects each pixel included in the raster image. If 3 pixels×3 pixels including a pixel being inspected at the center of these pixels correspond to a pattern as shown in FIG. 8C, the pattern matching unit 1013 replaces these pixels with a raster image constituted of 4 pixels×4 pixels at 2,400 dpi.

In this manner, the pattern matching unit 1013 carries out a pattern matching, and the raster image shown in FIG. 8A is thereby converted into the raster image shown in FIG. 8B. Obliquiely hatched patterns in FIG. 8B indicate black pixels, and differ from the raster image shown in FIG. 8A. All pixels of the raster image shown in FIG. 8A have been replaced with raster images at 2,400 dpi by the pattern matching unit 1013. Accordingly, the minimum unit of the raster image shown in FIG. 8B is one pixel at 2,400 dpi. Therefore, the edge size e of the raster image shown in FIG. 8B is "1". In a line-thinning processing executed by the image forming device 1 according to the second exemplary embodiment, a line-thinning is carried out with use of a window having a window size w=3, and thus, the relationship of window size w>edge size e is satisfied.

FIG. 9 show results of line-thinnings executed by the image forming device 1 according to the second exemplary embodiment. FIG. 9A shows a raster image of an oblique stripe image rasterized at 600 dpi by the controller 1001. FIG. 9B shows a raster image after a pattern matching is carried out by the pattern matching unit 1013 described previously. FIG. 9C shows a raster image obtained by performing once a line-thinning processing based on the Hilditch thinning algorithm, on the raster image in FIG. 9B. FIG. 9D shows a raster image obtained by this line-thinning processing on FIG. 9C. Thus, the image forming device 1 according to the second exemplary embodiment does not cause an oblique stripe to become discrete because a line-thinning processing is performed after converting the raster image of FIG. 9A into the raster image of FIG. 9B by a pattern matching. This is because, as in the first exemplary embodiment, the image forming device 1 according to the second exemplary embodiment satisfies the relationship of window size w>edge size e. Further, existence of the obliquely hatched parts in FIG. 8B contributes to elimination of black pixels which are in contact with each other only at vertices.

As has been described above, in the image forming devices 1 according to the first and second exemplary embodiments, the edge size e of a raster image is 2 or smaller before a line-thinning processing, and therefore, a line-thinning can be properly achieved even if the line-thinning processing is executed with a minimum window size w=3. In addition, black pixels which are in contact with each other only at corner vertices of pixels can be reduced, and accordingly, an oblique stripe subjected to a line-thinning is segmented discretely with reduced possibility. Further, a minimum window size w=3 can be used so that the processing scale can be reduced. Accordingly, load to image processing devices can be suppressed. Still further, a line-thinning of an image and a pattern matching are carried out separately, and no line-thinning is carried out in the pattern matching. Therefore, a large number of patterns need not be prepared for the line-thinning. A controller rasterizes received PDL data into a raster image at a smaller resolution than a resolution before the line-thinning processing. Load to the controller can therefore be suppressed so that PDL data can be rapidly received from an external device.

Figure 10:
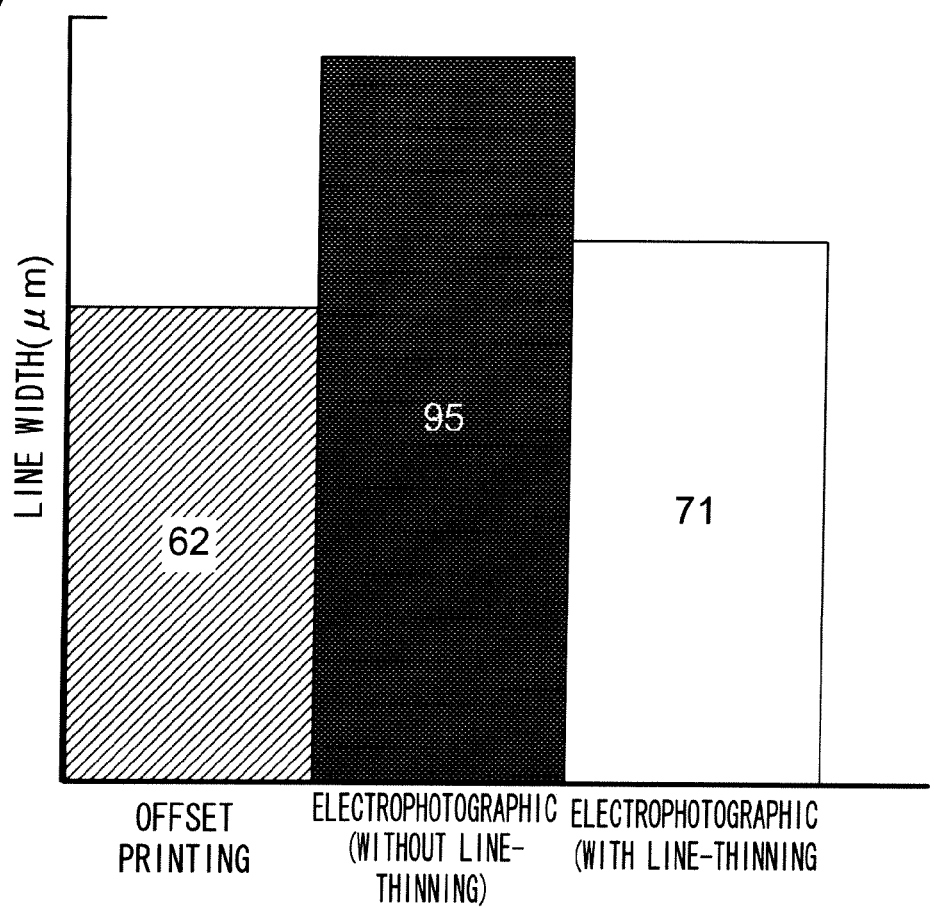
FIG. 10 shows results of measuring images formed by image forming devices according to the first exemplary embodiment.
Figure 11:
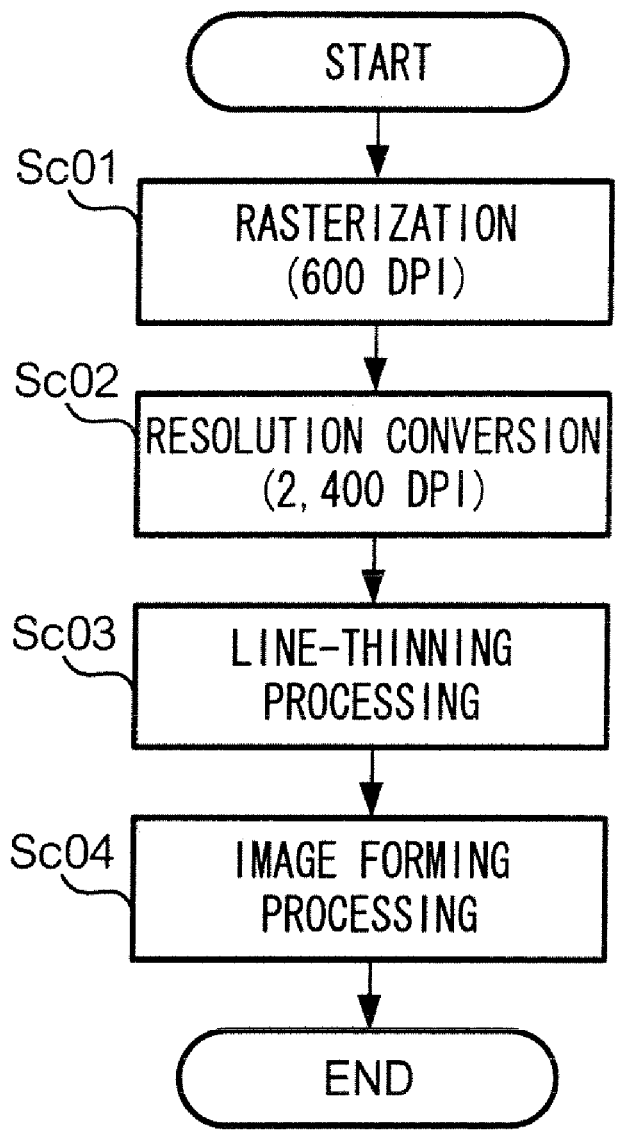
FIG. 11 is a flowchart showing a flow of a commonly used line-thinning processing and a pattern matching according to the related art.
Figure 12A:
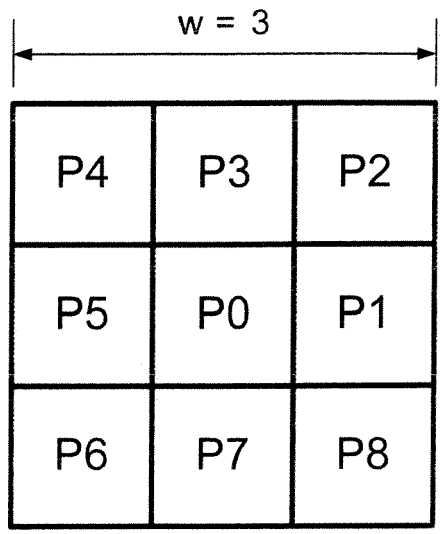
FIGS. 12A, 12B, and 12C illustrate a window used in a line-thinning processing, and a method for the line-thinning processing.
Figure 12B:
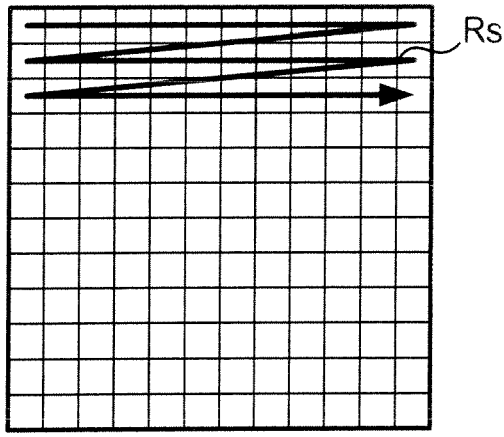
Figure 12C:
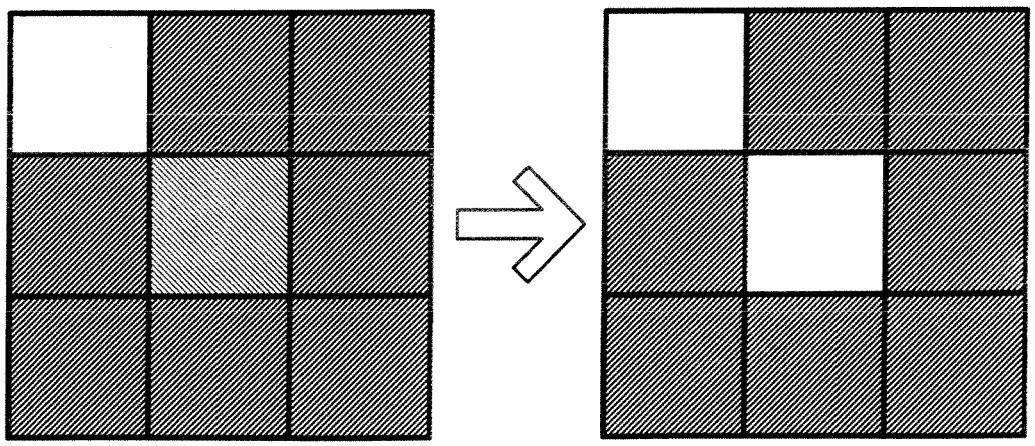
Figure 13A:
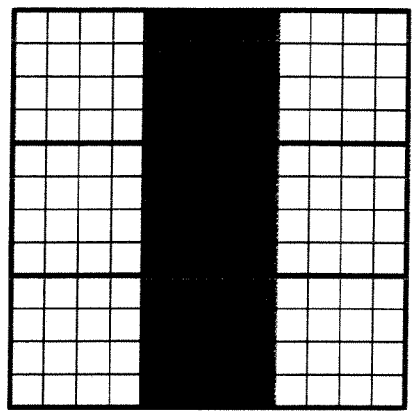
FIGS. 13A, 13B, 13C, 13D, 13E, and 13F respectively show results of performing line-thinning based on a contraction algorithm, on a vertical stripe image, a horizontal stripe image, and an oblique stripe image each including a stripe having a width of one pixel at 600 dpi.
Figure 13B:
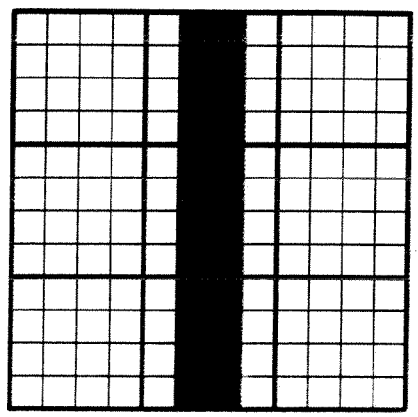
Figure 13C:
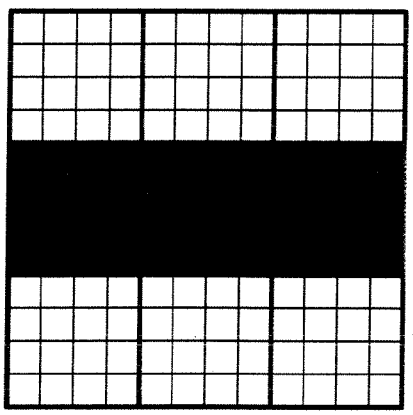
Figure 13D:
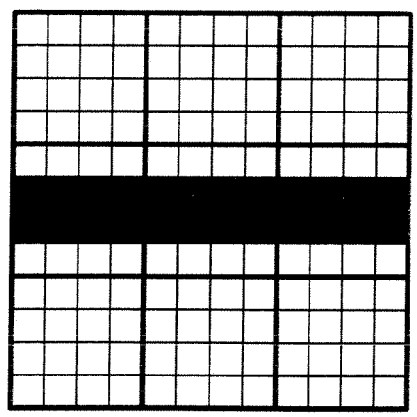
Figure 13E:
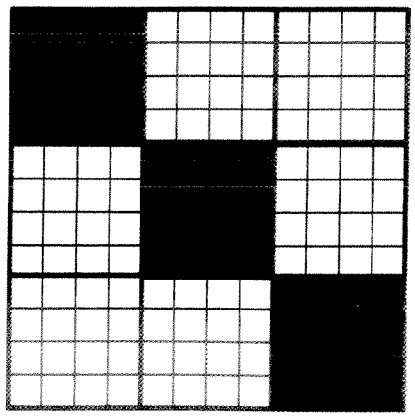
Figure 13F:
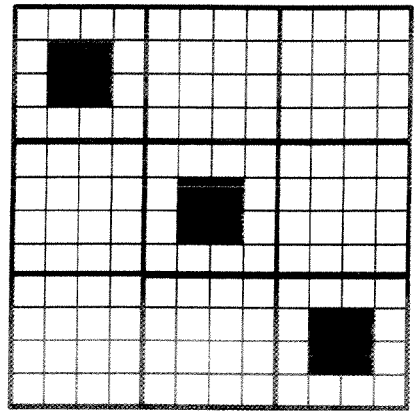
Figure 14A:
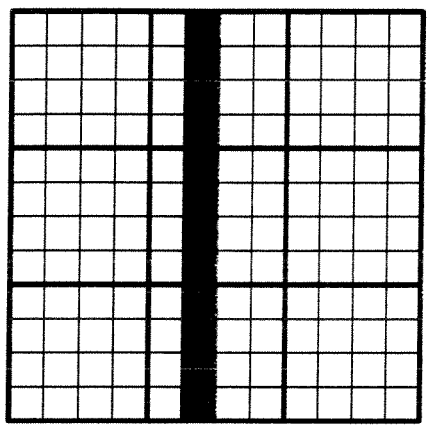
FIGS. 14A, 14B, 14C, and 14D respectively show results of performing line-thinning based on a Hilditch thinning algorithm, on a vertical stripe image, a horizontal stripe image, and an oblique stripe image each including a stripe having a width of one pixel at 600 dpi.
Figure 14B:
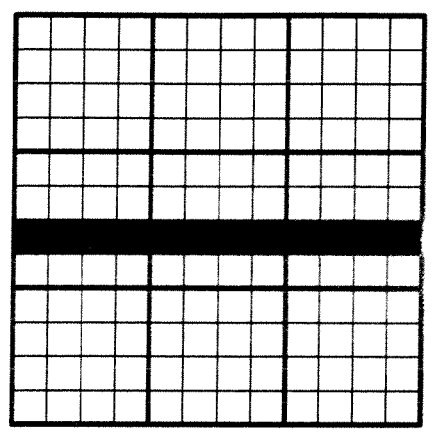
Figure 14C:
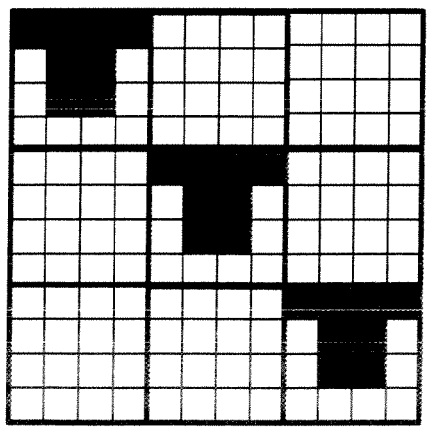
Figure 14D:
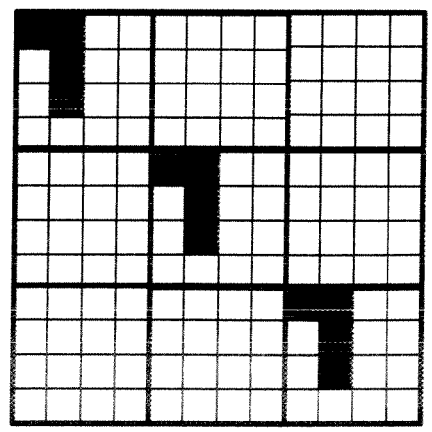

FIG. 10 is a graph showing a result of measuring line widths of images formed by the image forming device 1 according to the first exemplary embodiment. In this case, each of the images including a line having a width equivalent to one pixel at 600 dpi were formed on a surface of a recording material by various methods, and widths of lines in formed images were measured. A width of one pixel at 600 dpi is equivalent to about 42 μm where one inch is 25.4 mm. In case of an offset printing method, an actually measured width of the line was 62 μm. In case of an electrophotographic method which does not perform a line-thinning processing, an actually measured width of the line was 95 μm. It is hence understood that if a line having a width of one pixel at 600 dpi is printed by the electrophotographic method without performing a line-thinning processing, a printed line then has two or more times greater width than an original width. In contrast, in case of an electrophotographic method which employs a line-thinning processing according to one of the exemplary embodiments described above, an actually measured width of the line was 71 μm. That is, if only the line-thinning processing according to one of the exemplary embodiments is carried out, an image substantially equivalent to that obtained by the offset printing method can be formed even by the electrophotographic method.

C. Modification

The exemplary embodiments described above may be modified as follows. The modifications described below may be appropriately combined with each other.

1. In the above exemplary embodiments, the controller 1000 or 1001 rasterizes PDL data received from an external PC 2. However, these controllers may receive PDL data from any device other than the external PC 2. For example, PDL data may be received from an image reading device which reads an original image and outputs PDL data.

2. Also in the above exemplary embodiments, the controller 1000 or 1001 receives PDL data. Types of data received by these controllers are not limited to PDL data. That is, in case of the controller 1000 according to the first exemplary embodiment, input data need not be PDL data insofar as a raster image having a smaller resolution than a resolution used for a line-thinning processing is generated. Further, in a case of the controller 1001 in the second exemplary embodiment, input data need not be PDL data insofar as a raster image having the same resolution as a resolution used for a pattern matching is output. For example, each of the controllers automatically detects input data. If the input data is PDL data, each of the controllers perform a rasterization as described previously. Otherwise, if the input data is a raster image, the each of the controllers performs a resolution conversion upon necessity, and thereby generates and outputs a raster image at a predetermined resolution.

3. Also in the above exemplary embodiments, the image forming device utilizes the Hilditch thinning algorithm in the line-thinning processing. However, any other line-thinning algorithm may be used instead. For example, a contraction algorithm as described previously may be used. Even with use of the contraction algorithm, the first resolution stays equal to or higher than half the second resolution, in case of the first exemplary embodiment. In addition, the edge size e of a raster image which is output by the pattern matching unit 1013 stays smaller than the window size w=3, in case of the second exemplary embodiment. Therefore, the line-thinning processing unit 1014 is capable of performing a proper line-thinning on black pixels being inspected.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principle of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device that outputs a raster image to an image forming unit that forms an image at a first resolution on the basis of the raster image, comprising a non-transitory computer readable medium including a program and a computer executable program code, the device comprising:
    a raster image generation unit that generates a raster image at a second resolution that -is lower than the first resolution;
    a pattern storage unit that stores a layout pattern of pixels of a raster image having the second resolution in association with a raster image having the first resolution;
    a pattern matching unit that inspects pixels of the raster image having the second resolution generated by the raster image generation unit, and if there is a pixel group including a pixel and pixels surrounding the pixel that has a layout pattern identical to the layout pattern stored in the pattern storage unit, replacing the pixel with the raster image having the first resolution stored in the pattern storage unit;
    a line-thinning unit that performs line-thinning on the raster image having the first resolution generated by the pattern matching unit by inspecting pixels of the raster image having the first resolution, and if there is a pixel group including a pixel and pixels surrounding the pixel that satisfies a predetermined condition, replacing the pixel with a pixel of a different color, a number of pixels constituting an edge of the pixel group being equal to or greater than a number of pixels constituting an edge of a minimum unit of the raster image having the first resolution generated by the pattern matching unit; and
    an output unit that outputs the raster image having the first resolution subjected to line-thinning of the line-thinning unit to the image forming unit.

2. The image processing device according to claim 1, wherein the pixel group of the pixel and the pixels surrounding the pixel is a pixel group of 3 rows×3 columns.

3. An image forming device comprising:
    the image processing device according to claim 2; and
    the image forming unit.

4. An image forming device comprising:
    the image processing device according to claim 1; and
    the image forming unit.

5. An image processing device that outputs a raster image to an image forming unit that forms an image at a first resolution on the basis of the raster image, comprising a non-transitory computer readable medium including a program and a computer executable program code, the device comprising:
    a raster image generation unit that generates a raster image at a second resolution that is lower than the first resolution;
    a resolution conversion unit that converts the raster image having the second resolution generated by the raster image generation unit into a raster image having the first resolution;
    a line-thinning unit that performs line-thinning on the raster image having the first resolution generated by the resolution conversion unit by inspecting pixels of the raster image having the first resolution, and if there is a pixel group including a pixel and pixels surrounding the pixel that satisfies a predetermined condition, replacing the pixel with a pixel of a different color, a number of pixels constituting an edge of the pixel group being equal to or greater than a number of pixels at the first resolution constituting an edge of a minimum unit of the raster image having the second resolution generated by the raster image generation unit; and
    an output unit that outputs the raster image having the first resolution subjected to line-thinning of the line-thinning unit to the image forming unit.

6. The image processing device according to claim 5, wherein the pixel group of the pixel and the pixels surrounding the pixel is a pixel group of 3 rows×3 columns.

7. An image forming device comprising:
    the image processing device according to claim 6; and
    the image forming unit.

8. An image forming device comprising:
    the image processing device according to claim 5; and
    the image forming unit.

9. An image processing method for outputting a raster image to an image forming unit that forms an image at a first resolution on the basis of the raster image, comprising:
    generating a raster image at a second resolution that is lower than the first resolution;
    inspecting pixels of the generated raster image having the second resolution, and if there is a pixel group including a pixel and pixels surrounding the pixel that has a layout pattern identical to a predetermined layout pattern, replacing the pixel with a raster image having the first resolution associated with the predetermined layout pattern;
    performing line-thinning on the raster image having the first resolution by inspecting pixels of the raster image having the first resolution, and if there is a pixel group including a pixel and pixels surrounding the pixel that satisfies a predetermined condition, replacing the pixel with a pixel of a different color, a number of pixels constituting an edge of the pixel group being equal to or greater than a number of pixels constituting an edge of a minimum unit of the raster image having the first resolution generated by the pattern matching unit; and outputting the raster image having the first resolution subjected to line-thinning to the image forming unit.

10. The image processing method according to claim 9, wherein the pixel group of the pixel and the pixels surrounding the pixel is a pixel group of 3 rows×3 columns.

* * * * *